June 3,255,280
METHOD OF ALIGNING FIBERS OF A MULTIPLE FIBER BUNDLE
Filed April 24, 1963
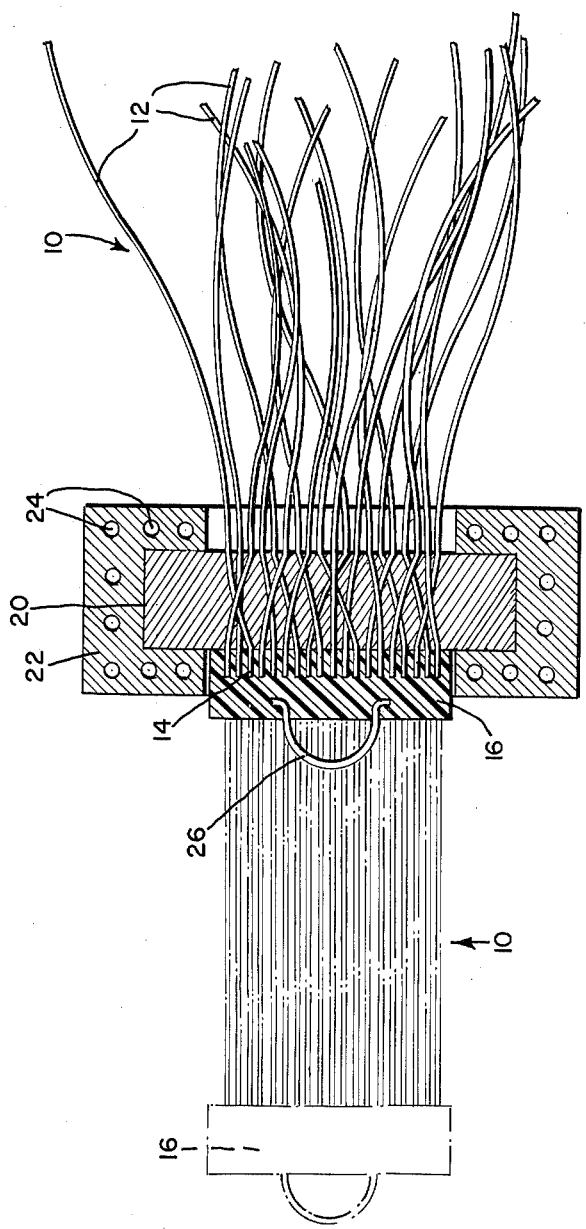
INVENTOR.
CURT BURROWES
BY Stowell & Stowell
ATTORNEYS

3,255,280
METHOD OF ALIGNING FIBERS OF A MULTIPLE FIBER BUNDLE

Curt Burrowes, Southbridge, Mass., assignor to Mosaic Fabrications, Inc., Southbridge, Mass., a corporation of Massachusetts
Filed Apr. 24, 1963, Ser. No. 275,262
3 Claims. (Cl. 264—1)

This invention relates to an improved method for aligning fibers of a multiple fiber bundle.

In many applications of fiber optical bundles, it is necessary that the arrangement of the fibers at opposite ends of the bundle be in an identical ordered array whereby an image received at one end of the bundle will be accurately transmitted to the opposite end. If the fiber optical device comprises a face plate or the like for a cathode ray tube having a relatively narrow face-to-face dimension and wherein each of the fibers or groups of fibers is fused to adjacent fibers or groups of fibers, alignment of the plurality of fibers is not a particularly difficult problem. However, in the construction of fiber optical endoscopes, periscopes and the like, where the fiber bundle has substantial length and may be flexible between the end faces thereof, providing an orderly array of the fibers at opposite ends of the bundle to maintain exact correspondence in the transmission of an image has presented the industry with a substantial alignment problem.

It is, therefore, a principal object of the present invention to provide a method for aligning all or a selected group of the fibers of a multiple fiber bundle in a predetermined ordered array at opposite ends of the bundle or at any predetermined intermediate position along the length of the bundle.

The invention is not limited to a method of ordered arrangement of fiber optical fibers but may be applied to bundles of filaments, wires, metal cored glass fibers, and the like, where an ordered array at opposite ends or at intermediate zones along the length of the fibers is desired. Throughout the specification and claims, the term "fiber" means any thread or threadlike structure or object or group of thread or threadlike objects intimately joined or immobilized along the length of the individual fibers of the group and the like.

The foregoing and other objects and advantages of the present invention are provided by a method of aligning fibers of a multiple fiber bundle comprising immobilizing the fibers of the bundle in a selected zone extending transversely through the bundle, forming or casting a die about the bundle immediately adjacent the immobilized zone, causing relative movement between the formed die and the fibers of the bundle in a direction along the fibers and immobilizing the fibers in at least one zone transverse of the bundle between the die and the first immobilized zone.

The invention will be more particularly described with reference to the illustrated embodiment thereof shown in the accompanying drawing diagrammatically illustrating one form of apparatus suitable for carrying out the method of the invention.

Referring to the drawing, 10 generally designated a fiber bundle composed of a plurality of fibers or multiple fibers 12. In the drawing, the size of the fibers and the spacing therebetween has been enlarged for illustrative purposes only as it will be appreciated by those skilled in the art that the size of the fibers in a fiber optical bundle may be in the order of, for example, 5 to about 50 microns and that the fibers of the bundle would be packed in intimate side-by-side relationship.

In carrying out the principles of the present invention, one end, or some intermediate zone between the ends of the bundle, is immobilized in any random array by mechanically clamping the fibers one against another or by potting the fibers in a cementitious composition which upon hardening or curing will intimately bond the fibers in the desired array. In the illustrated form of the invention, the end 14 of the bundle 10 is illustrated as being potted in a plastic mass 16. Suitable potting compositions may comprise: epoxy resins, thermal setting waxes and resins and cements which set by evaporation of a volatile component.

Immediately adjacent the immobilized zone of the fiber bundle, a die is formed about the fibers. In the illustrated form of the invention, the die is formed by freezing about the fibers of the bundle an ice block 20. The ice block 20 is formed and maintained in the solid state in a mold 22 provided with channels 24 for the circulation of a cooling medium which, in turn, is connected to a source of refrigeration (not shown in the drawing).

With the fibers of the bundle 10 maintained in the formed die 20, the fiber bundle is drawn through the die as illustrated in broken lines in the drawing. In the illustrated form of the invention, a ring-like element 26 having its ends potted in potting composition 16 is grasped when drawing the fiber bundle through the formed die 20. As the fibers 12 of the bundle 10 are pulled through the formed die, the fibers assume the array originally imparted to the fibers at the interface of the immobilizing member 14 and the ice block 20. The fibers 12 are held in alignment, after emerging from the surface of the formed die, in any number of desired transverse zones by immobilizing the fibers by mechanical means which may be identical to the means initially employed in immobilizing the first zone.

Forming the die by freezing water about the fibers of the bundle has been found to provide very satisfactory results as the water, when frozen into ice, has the useful property that it will melt in a small region about the fibers when the fibers of the bundle are placed under tension, thereby providing lubrication for the fibers as they are drawn through the die. Further tension melting of the frozen die permits drawing of fibers through the die which are tapered or may have irregularities along their length without destroying the ordered alignment of the original array.

Other suitable materials for forming the die about the fibers of the bundle are the low melting, fusible alloys of bismuth, lead, tin, and cadmium such as Woods metal; and cured and partially cured plastic compositions such as the polyester resins, natural resins and waxes.

Example

About 1500 fibers, of about 1/10 inch in cross-section and about 12 inches in length, were gathered into a bundle.

Each of the fibers comprised a glass rod having a glass sleeve of lower index of refraction.

About 1/4 inch of one end of the bundle was potted in a cementitious composition consisting of a fast curing epoxy resin.

An ice die was formed about the fibers of the bundle immediately adjacent the face of the potting composition directed toward the unpotted end of the bundle. The ice die had a length along the fibers of about 1½ inches.

Ten inches of the fiber bundle were pulled through the ice die and the fibers were again immobilized in the manner employed in potting the first end of the bundle.

The potting material was ground down to expose the ends of the glass fibers and the glass fibers were ground and polished.

The resulting flexible fiberscope was found to transmit a satisfactory image.

From the foregoing description it will be seen that the present invention fully accomplishes the aims and objects hereinabove set forth. It will further be appreciated by those skilled in the art that various modifications may be made in the process without departing from the scope of the appended claims.

I claim:

1. A method of aligning fibers of a multiple fiber bundle comprising mechanically immobilizing the fibers of the bundle in a selected zone extending transversely through the bundle, flowing a fluid material about the fibers of the bundle and causing said fluid to harden and to thereby form a die about the fibers of the bundle immediately adjacent the mechanically immobilized zone, drawing the fiber bundle through the die in a direction along the fibers of the bundle, and immobilizing the fibers in at least one zone transverse to the bundle between the formed die and the first mechanically immobilized zone.

2. A method of aligning fibers of a multiple fiber bundle comprising mechanically holding the fibers of the bundle in a selected zone extending transversely through the bundle, freezing water about the bundle immediately adjacent the mechanically immobilized zone to form a die about the fibers, drawing the fibers through the frozen die in a direction along the fibers and mechanically immobilizing the fibers in at least one zone transverse of the bundle as the fibers emerge from the frozen die.

3. A method of aligning fibers of a multiple fiber bundle comprising immobilizing the fibers of the bundle in a selected zone extending transversely through the bundle, casting a unitary die which surrounds each fiber of the bundle immediately adjacent the immobilized zone, the said unitary die being in contact with the entire periphery of each of said fibers of said bundle, causing relative movement between the formed die and the fibers of the bundle in a direction along the fibers, and immobilizing the fibers in at least one zone transverse of the bundles between the die and the first immobilized zone.

References Cited by the Examiner

UNITED STATES PATENTS

| | | | |
|---|---|---|---|
| 1,012,389 | 12/1911 | Marche | 156—80 |
| 2,210,432 | 8/1940 | Roesch | 156—180 |
| 2,311,704 | 2/1943 | Simison | 156—296 X |
| 2,741,294 | 4/1956 | Pancherz | 156—180 |
| 2,875,501 | 3/1959 | Gravley | 156—180 X |
| 3,141,105 | 7/1964 | Courtney-Pratt | 88—1 |

FOREIGN PATENTS 885,767   6/1943   France.

EARL M. BERGERT, *Primary Examiner.*

C. B. COSBY, *Assistant Examiner.*